(12) United States Patent
Yanjarappa et al.

(10) Patent No.: US 9,758,397 B2
(45) Date of Patent: Sep. 12, 2017

(54) N-VINYLPYRROLIDONE-BASED CATIONIC COPOLYMER FOR SEPARATING AN OIL-IN-WATER EMULSION

(71) Applicant: Dow Global Technologies LLC, Midland, MI (US)

(72) Inventors: M. J. Yanjarappa, Pune (IN); Cecile Boyer, Lake Jackson, TX (US); Stephen M. Hoyles, Lake Jackson, TX (US); Michael K. Poindexter, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 88 days.

(21) Appl. No.: 14/414,645

(22) PCT Filed: Jul. 30, 2013

(86) PCT No.: PCT/US2013/052698
§ 371 (c)(1),
(2) Date: Jan. 13, 2015

(87) PCT Pub. No.: WO2014/022374
PCT Pub. Date: Feb. 6, 2014

(65) Prior Publication Data
US 2015/0166378 A1    Jun. 18, 2015

Related U.S. Application Data

(60) Provisional application No. 61/677,087, filed on Jul. 30, 2012.

(51) Int. Cl.
*B01D 17/04*    (2006.01)
*B01D 17/02*    (2006.01)
(Continued)

(52) U.S. Cl.
CPC .............. *C02F 1/56* (2013.01); *B01D 17/047* (2013.01); *C09K 8/36* (2013.01); *C10G 33/04* (2013.01);
(Continued)

(58) Field of Classification Search
None
See application file for complete search history.

(56) References Cited

U.S. PATENT DOCUMENTS 3,488,294 A    1/1970   Annand
3,910,862 A *  10/1975  Barabas ............... A61K 8/8182
                                                      424/70.15

(Continued)

FOREIGN PATENT DOCUMENTS

EP    0544158       6/1993
ES    2091996      11/1996
WO    2009067362    5/2009

OTHER PUBLICATIONS

K. Arnold, et al., "Surface Production Operations Design of Oil Handling Systems and Facilities" Third Edition (3 pgs).
(Continued)

*Primary Examiner* — Clare Perrin
(74) *Attorney, Agent, or Firm* — Brooks, Cameron & Huebsch, PLLC

(57) ABSTRACT

Embodiments of the present disclosure include a method of separating an oil-in-water emulsion formed during crude oil production into a water phase and an oil phase that includes adding 1 part-per-million (ppm) to 10000 ppm of an N-vinylpyrrolidone based cationic copolymer to the oil-in-water emulsion, based on the total volume of the oil-in-water emulsion, to form a water phase and an oil phase, and separating the water phase from the oil phase.

5 Claims, 3 Drawing Sheets

(51) Int. Cl.

| | | |
|---|---|---|
| C02F 1/52 | (2006.01) | |
| C02F 1/68 | (2006.01) | |
| C09K 8/588 | (2006.01) | |
| E21B 21/06 | (2006.01) | |
| C02F 1/56 | (2006.01) | |
| C09K 8/36 | (2006.01) | |
| C10G 33/04 | (2006.01) | |
| C02F 1/00 | (2006.01) | |
| B01D 21/00 | (2006.01) | |
| B01D 21/01 | (2006.01) | |
| B03D 3/00 | (2006.01) | |
| C09K 8/02 | (2006.01) | |
| C09K 8/524 | (2006.01) | |
| C09K 8/528 | (2006.01) | |
| C09K 8/60 | (2006.01) | |
| C02F 101/32 | (2006.01) | |
| C02F 103/10 | (2006.01) | |

(52) U.S. Cl.
CPC ...... C02F 2101/32 (2013.01); C02F 2103/10 (2013.01); C09K 8/588 (2013.01); E21B 21/063 (2013.01); E21B 21/068 (2013.01)

(56) References Cited

U.S. PATENT DOCUMENTS

| | | | |
|---|---|---|---|
| 4,026,794 A | 5/1977 | Mauceri | |
| 4,120,815 A | 10/1978 | Raman | |
| 4,160,742 A | 7/1979 | Raman | |
| 4,224,150 A | 9/1980 | Buriks et al. | |
| 4,383,926 A | 5/1983 | Buriks et al. | |
| 4,702,844 A | 10/1987 | Flesher et al. | |
| 4,741,835 A | 5/1988 | Jacques et al. | |
| 4,802,992 A * | 2/1989 | Fong | B01D 17/047 210/709 |
| 4,931,191 A | 6/1990 | Braden et al. | |
| 5,128,046 A * | 7/1992 | Marble | B01D 17/0205 166/267 |
| 5,362,827 A | 11/1994 | Bock et al. | |
| 5,552,498 A | 9/1996 | Braden | |
| 5,560,832 A | 10/1996 | Sivakumar et al. | |
| 5,635,112 A | 6/1997 | Ramesh et al. | |
| 5,730,905 A | 3/1998 | Hart et al. | |
| 5,921,912 A | 7/1999 | Hart et al. | |
| 6,025,426 A | 2/2000 | Hurlock et al. | |
| 6,036,868 A * | 3/2000 | Sivakumar | B01D 17/047 210/708 |
| 7,381,332 B2 * | 6/2008 | Pena | C09K 8/32 175/66 |
| 2006/0237372 A1 | 10/2006 | Arciszewski et al. | |
| 2011/0031163 A1 | 2/2011 | Byrne et al. | |

OTHER PUBLICATIONS

International Search Report and Written Opinion for related PCT Application PCT/US2013/052698, mailed Oct. 17, 2013 (7 pgs).
International Preliminary Report on Patentability for related PCT Application PCT/US2013/052698, mailed Oct. 20, 2014 (14 pgs).
Technical Information: Luviquat Polymer Grades; "Quaternized Copolymers for Hair and Skin Care"; BASF The Chemical Company—Personal Care, May 8, 2012 (32 pgs).

* cited by examiner

N-VINYLPYRROLIDONE-BASED CATIONIC COPOLYMER FOR SEPARATING AN OIL-IN-WATER EMULSION

This application is a National Stage Application under 35 U.S.C. §371 of International Application Number PCT/US2013/052698, filed Jul. 30, 2013 and published as WO 2014/022374 on Feb. 6, 2014, which claims the benefit to U.S. Provisional Application 61/677,087, filed Jul. 30, 2012, the entire contents of which are incorporated herein by reference in its entirety.

FIELD OF THE DISCLOSURE

The present disclosure relates to a method of separating an oil-in-water emulsion and more particularly to a method of separating an oil-in-water emulsion formed during crude oil production.

BACKGROUND

Chemical aids used to remove dispersed oil and/or solids from water are commonly referred to as water clarifiers, reverse emulsion breakers, deoilers, coagulants, flocculants and/or coalescence aids. In the oil and gas industry, after the initial separation of the bulk produced fluids (e.g., crude oil), the produced water still contains finely dispersed solids and oil. These oil and solids particles are well stabilized and are difficult to separate by means of physical settling alone. Often, such produced water cannot be reused nor disposed of as is and it is therefore necessary to find appropriate solutions to do so. Regulations around the world generally limit the oil and grease content in produced water to a maximum of 15 parts-per-million (ppm) to 50 ppm for discharge into the environment (Arnold, K.; Stewart, M. Surface Production Operations; 3rd ed.; Elsevier/Gulf: Boston, 2008, 483). The water is thus treated to meet regulatory, environmental, and operational goals.

A range of synthetic water soluble cationic polymers are known to separate oil/solid particles from produced water. Poly(diallyl dimethylammonium chloride), copolymers of acrylamide or alkyl acrylates with various cationic co-monomers are known as water clarifiers. Chemical treatment of the produced water involves the addition of a few ppm levels of inorganic salts and/or organic polymers to facilitate the separation through coagulation and floc formation. Organic polymers (ionic or neutral) can be more effective than the inorganic salts and results in water with minimum oil/solid residues.

SUMMARY

The present disclosure provides a method of separating an oil-in-water emulsion formed during crude oil production into a water phase and an oil phase using a cationic copolymer. As discussed herein, the oil-in-water emulsion includes droplets of oil, such as crude oil. Specifically, embodiments of the present disclosure include a method of separating the oil-in-water emulsion formed during crude oil production into a water phase and an oil phase that includes adding 1 part-per-million (ppm) to 10000 ppm of an N-vinylpyrrolidone-based cationic copolymer to the oil-in-water emulsion, based on the total volume of the oil-in-water emulsion, to form a water phase and an oil phase, and separating the water phase from the oil phase.

DETAILED DESCRIPTION

Figure 1A:
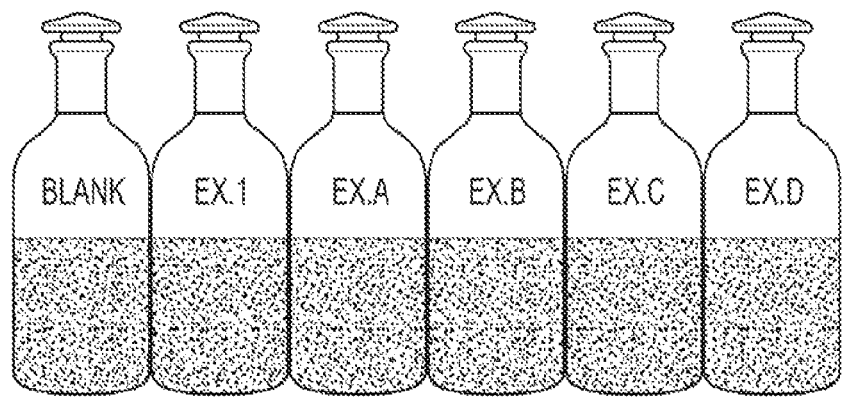
FIG. 1A is a photographic image of the synthetic produced oil-in-water emulsion for Bottle Test Procedure 1, treated with 0 ppm of cationic polymer Example 1 and Comparative Examples A-D (pH about 6.9).

The present disclosure provides a method of separating an oil-in-water emulsion, commonly referred to in the oilfield industry as a reverse emulsion, using a cationic copolymer, where the cationic copolymer helps to break the emulsion into a water phase and an oil phase. The method of the present disclosure is particularly useful in crude oil production and processing systems including refinery water treatment and even petrochemical plants.

As discussed herein, an oil-in-water emulsion can include droplets of oil, such as crude oil. The oil-in-water emulsion can also include, besides oil droplets, solid particles, such as clays, silts, sand, corrosion by-products, and scale, among other solid particles which can be present in the emulsion. As discussed herein, separating the oil-in-water emulsion is a process in which the emulsion is broken into its constituents of a water phase and an oil phase. As used herein, the "water" of the oil-in-water emulsion and/or the water phase can include, for example, a brine, a connate water, surface water, steam condensate, carbonated water, sea water and a combination thereof. For brevity, the word "water" is used herein, where it is understood that "brine," "connate water," "surface water," "steam condensate," "carbonated water," and/or "sea water" can be used interchangeably where needed.

The oil-in-water emulsion can be produced in extracting crude oil (a naturally occurring flammable liquid found in geological formations beneath the earth's surface, which consists of a complex mixture of hydrocarbons of various molecular weights). An oil-in-water emulsion can be formed in almost every phase of crude oil production and processing. As used herein, "oil-in-water" emulsions can include oil-in-water (e.g., a reverse emulsion) and multiple or complex emulsions, as are known, where the oil forms the dispersed phase and the water forms the continuous phase. Droplets or particles of the oil-in-water emulsion can, but need not, vary in size from 1 micrometer to 1000 micrometer. Droplets or particles of less than 1 micrometer and/or greater than 1000 micrometer are also possible. As used herein, resolution, separation or reverse demulsification means the breaking of an oil-in-water emulsion into an oil phase and a water phase.

The cationic copolymer of the present disclosure is an N-vinylpyrrolidone-based cationic copolymer. For the various embodiments, the N-vinylpyrrolidone-based cationic copolymer is formed with monomers of N-vinyl-2-pyrrolidone and a quaternized dimethylaminoethyl methacrylate. The quaternized dimethylaminoethyl methacrylate can consist of 2-ethyldimethylaminoethyl methacrylate ethyl sulfate to provide a poly[(2-ethyldimethylaminoethyl methacrylate ethyl sulfate)-co-N-vinyl-2-pyrrolidone]. For the various embodiments, the N-vinylpyrrolidone-based cationic copolymer can be supplemented with low levels of additives without impairing separation performance. The additive can consist of, but is not limited to, biocidal preservatives and can be included at levels up to 1 wt. % relative to the total weight of the cationic copolymer/additive mixture. In one embodiment, the N-vinylpyrrolidone-based cationic copolymer is a copolymer of N-vinyl-2-pyrrolidone (67 weight percent (wt. %) based on the total weight of the copolymer) and 2-ethyldimethylaminoethyl methacrylate ethyl sulfate (33 wt. %).

One such N-vinylpyrrolidone-based cationic copolymer is poly[(2-ethyldimethylaminoethyl methacrylate ethyl sulfate)-co-N-vinyl-2-pyrrolidone] formed as a reaction product of about 67 wt. % of N-vinyl-2-pyrrolidone and about 33 wt. % of 2-ethyldimethylaminoethyl methacrylate ethyl sulfate. One such N-vinylpyrrolidone-based cationic copolymer is available from BASF under the trade name LUVIQUAT® PQ 11.

The cationic copolymer of the present disclosure can be prepared by solution, emulsion, or dispersion polymerization techniques. The weight average molecular weight of the N-vinylpyrrolidone-based cationic copolymer can range from 5000 grams/mole (g/mol) to 5000000 g/mol and preferably ranges from 20000 g/mol to 2000000 g/mol. In one embodiment, the N-vinylpyrrolidone-based cationic copolymer of the present disclosure has a weight average molecular weight of about 1000000 g/mol. Weight average molecular weight can be measured by gel permeation chromatography or small-angle dynamic light scattering.

Using the cationic copolymer of the present disclosure in separating an oil-in-water emulsion formed during crude oil production into a water phase and an oil phase may be carried out in a conventional manner. For example, separating the oil-in-water emulsion into an oil phase and a water phase and then recovering the oil phase and water phase may be carried out by treating the oil-in-water emulsion with a separating amount of the cationic copolymer of the present disclosure. Examples of separating the oil-in-water emulsion formed during crude oil production into a water phase and an oil phase can include adding 1 part-per-million (ppm) to 10000 ppm of the N-vinylpyrrolidone-based cationic copolymer to the oil-in-water emulsion, based on the total volume of the oil-in-water emulsion, to form a water phase and an oil phase. As used herein, ppm is a concentration where one ppm is equivalent to one part per 1000000 parts (e.g. 1 microlitersN-vinylpyrrolidone-based cationic copolymer per liter of oil-in-water emulsion). Other examples of separating the oil-in-water emulsion formed during crude oil production into a water phase and an oil phase can include adding 10 ppm to below 10000 ppm, adding 10 ppm to 1000 ppm, or adding 10 ppm to 100 ppm of the N-vinylpyrrolidone-based cationic copolymer to the oil-in-water emulsion, based on the total volume of the oil-in-water emulsion, to form a water phase and an oil phase.

Once formed, the water phase is separated from the oil phase. Once separated, either one of the water phase and/or the oil phase can be recovered for further processing. It may be possible that the oil phase so produced may be a dehydrated oil as is known in the art. For the various embodiments, it is also possible that the water phase might have a maximum of 15 ppm to 50 ppm of the particles (e.g., oil droplets). To determine the ppm of oil in the water phase use a standard oil ppm curve. To prepare the standard oil ppm curve, prepare a series of known concentrations of oil (the same oil present in the water phase) in a solvent (e.g., toluene; 1,1,1-trichloroethane; or Freon) and test the samples using a visible or IR spectrometer. Prepare the standard oil ppm curve from the results of the test. Use the same solvent to extract oil from the water phase discussed herein. After the extraction, test the solvent using the visible or IR spectrometer in the same manner and compare the results to standard oil ppm curve. The ppm of the particles (e.g., oil droplets) in the water phase can then be interpolated from the standard oil ppm curve. The method of the present disclosure includes adding the N-vinylpyrrolidone-based cationic copolymer to the oil-in-water emulsion, based on the total volume of the oil-in-water emulsion, to form a water phase and an oil phase. In the oilfield, process conditions and the location of chemical injection points for water treatment chemicals vary from site to site as described in Arnold, K.; Stewart, M. Surface Production Operations; 3rd ed.; Elsevier/Gulf: Boston, 2008, Chapter 9, pp 482-609 as well as Manning, F. S.; Thompson, R. E. Oilfield Processing Volume 2: Crude Oil; Pennwell: Tulsa, 1995, Chapter 8, pp 145-158. The water phase of the oil-in-water emulsion can have a pH value in a range of 5 to 9. The N-vinylpyrrolidone-based cationic copolymer of the present disclosure can help to destabilize the oil-in-water emulsion so as to enhance flocculation and eventual coalescence of the dispersed phase. A mixing process can be used with the oil-in-water emulsion in breaking the emulsion with the N-vinylpyrrolidone-based cationic copolymer of the present disclosure. For example, sufficient agitation can be used to allow the N-vinylpyrrolidone-based cationic copolymer of the present disclosure to mix thoroughly with the oil-in-water emulsion, followed by a period of flow inside a separator to promote gravity separation. The process also requires sufficient retention time in the separators to resolve the oil and water phases. The process may also require the addition of heat, gas flotation, and coalescers to facilitate separating the emulsion.

As appreciated, the efficacy of the cationic copolymer (e.g., the N-vinylpyrrolidone-based cationic copolymer) of the present invention can be dependent upon a number of factors such as the properties of the crude oil and/or the water of the emulsion, the mixer type, and the design and operating conditions of the separating equipment. The most effective conditions for the separation may be at least partially determined through the use of a bottle testing procedure, as is known.

Other factors that can influence the separation can include, but are not limited to, temperature, pH, type of crude oil, brine composition, solids content, oil content, system residence time, and droplet size distribution. An increase in temperature can result in a decrease in emulsion stability. The pH of the oil-in-water emulsion may also affect the performance of the cationic copolymer of the present disclosure. Surprisingly, the N-vinylpyrrolidone-based cationic copolymer of the present disclosure is a high pH tolerant cationic water clarifier, which may offer differentiated solutions to those seeking to resolve oil-in-water emulsions having a high pH (e.g., those having a pH of 7.0 to 9.0).

Additionally, other additives such as conventional coagulants, conventional flocculants, alum, preservatives or a combination thereof may also be utilized with the N-vinylpyrrolidone-based cationic copolymer.

The following examples are presented to describe preferred embodiments and utilities of the invention and are not meant to limit the invention unless otherwise stated in the claims appended hereto.

EXAMPLES

Example 1

A copolymer of N-vinyl-2-pyrrolidone (67 wt. %) and 2-ethyldimethylaminoethyl methacrylate ethyl sulfate (33 wt. %) (LUVIQUAT® PQ 11, BASF, 20 wt. % aqueous solution, weight average molecular weight approximately 1000000 grams/mole (g/mol)).

Comparative Example A

A copolymer of acrylamide (80 wt. %) and diallyldimethyl ammonium chloride (20 wt. %) (polyAAm-DADMAC, Aldrich #409081, 10 wt. % aqueous solution).

Comparative Example B

A copolymer of N-vinyl-2-pyrrolidone (70 wt. %) and 3-methyl-N-vinylimidazolium chloride (30 wt. %) (LUVIQUAT® FC370, BASF, 40 wt. % aqueous solution, weight average molecular weight approximately 100000 g/mol).

Comparative Example C

A copolymer of N-vinyl-2-pyrrolidone (50 wt. %) and 3-methyl-N-vinylimidazolium chloride (50 wt. %) (LUVIQUAT® FC 550, BASF, 40 wt. % aqueous solution, weight average molecular weight approximately 80000 g/mol).

Comparative Example D

A copolymer of N-vinyl-2-pyrrolidone (55 wt. %) and 3-methyl-N-vinylimidazolium chloride (45 wt. %) (LUVIQUAT® HM 552, BASF, 20 wt. % aqueous solution, weight average molecular weight approximately 400000 g/mol).

Aqueous Solution of the Cationic Polymer: 0.1 wt. % of active solution was prepared by dissolving appropriate amounts of above cationic polymer (Example 1 and Comparative Examples A-D) in 100 milliliter (mL) of deionized (DI) water.

Bottle Test Procedure

Bottle Test Procedure 1—Synthetic Produced Oil-in-Water Emulsion pH about 6.9

Prepare a synthetic produced oil-in-water emulsion by mixing at room temperature (23° C.) 6.5 mL of mid-gravity Middle Eastern crude oil with 650 mL of DI water (1 wt. %) for about 10 seconds under high shear (12000 rpm) in a high shear rotor-stator mixer and continue the agitation for a further 4 minutes under high shear of 12000 rpm. The resultant synthetic produced oil-in-water emulsion has a pH of about 6.9.

Distribute the synthetic produced oil-in-water emulsion into 6 reagent bottles (100 mL each). An image of the untreated bottles is captured immediately (FIG. 1A).

Figure 1B:
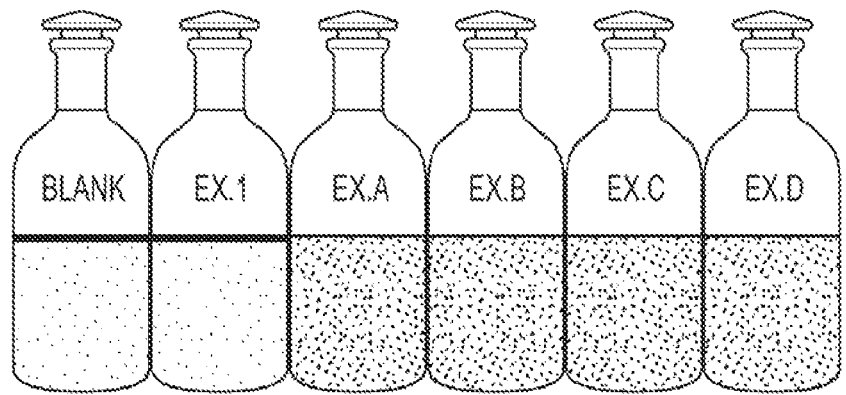
FIG. 1B is a photographic image of the synthetic produced oil-in-water emulsion for Bottle Test Procedure 1, treated with 100 ppm of cationic polymer Example 1 and Comparative Examples A-D (pH about 6.9).
Figure 1C:
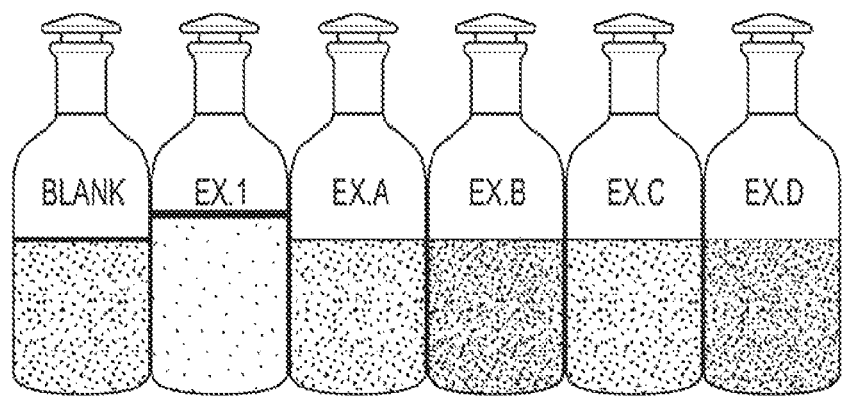
FIG. 1C is a photographic image of the synthetic produced oil-in-water emulsion for Bottle Test Procedure 1, treated with 300 ppm of cationic polymer Example 1 and Comparative Examples A-D (pH about 6.9).

Add a dose (as indicated in the brief description of FIGS. 1B and 1C) of a 0.1 wt. % aqueous solution of each cationic polymer (Example 1 and Comparative Examples A-D) to a separate bottle and include one "BLANK" bottle without any cationic polymer additive for comparison. The dosage level, in ppm (by weight), is based on the amount of cationic polymer added to the total weight of the reverse emulsion in each bottle. Shake all bottles by hand 50 times and allow to resolve for one minute to allow floc formation before capturing an image. Obtain images in the presence of a 100 ppm dosage of cationic polymer (FIG. 1B) and a 300 ppm dosage of cationic polymer (FIG. 1C).

It was observed that the resultant oil flocs separate and float on the surface of the water. It is evident from the results that the cationic polymer from Example 1 facilitates the separation of residual oil and solid particles from the synthetic produced oil-in-water emulsion at a concentration of both 100 ppm and 300 ppm, at a pH of about 6.9.

Bottle Test Procedure 2—Synthetic Produced Oil-in-Water Emulsion pH about 7.7

Prepare the synthetic produced oil-in-water emulsion as in Bottle Test Procedure 1 except add 250 μL of 2 wt. % aqueous NaOH solution to 650 mL of DI water before adding the crude oil. The resultant synthetic produced oil-in-water emulsion has a pH of about 7.7.

Figure 2A:
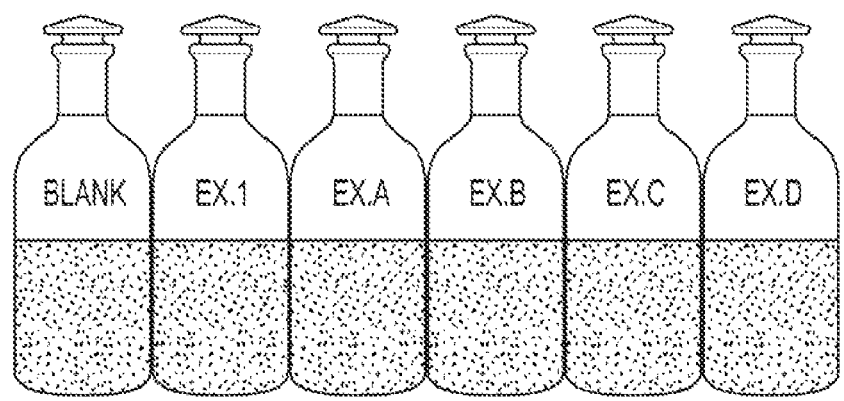
FIG. 2A is a photographic image of the synthetic produced oil-in-water emulsion for Bottle Test Procedure 2, treated with 0 ppm of cationic polymer Example 1 and Comparative Examples A-D (pH about 7.7).

Distribute the synthetic produced oil-in-water emulsion into 6 reagent bottles (100 mL each). An image of the untreated bottles is captured immediately (FIG. 2A).

Figure 2B:
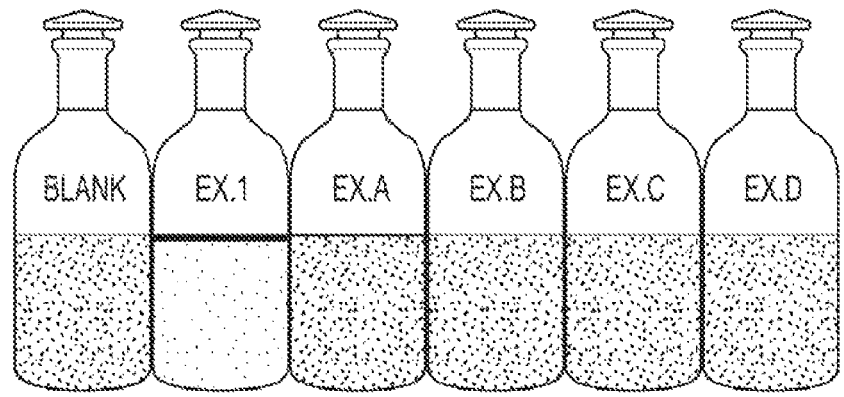
FIG. 2B is a photographic image of the synthetic produced oil-in-water emulsion for Bottle Test Procedure 2, treated with 50 ppm of cationic polymer Example 1 and Comparative Examples A-D (pH about 7.7).
Figure 2C:
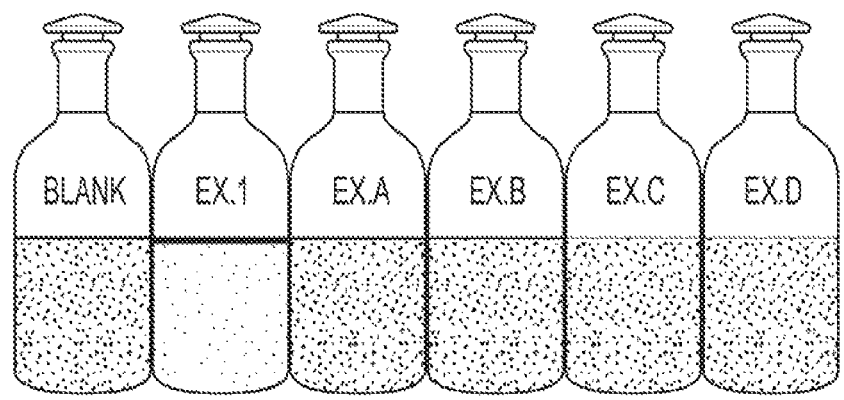
FIG. 2C is a photographic image of the synthetic produced oil-in-water emulsion for Bottle Test Procedure 2, treated with 100 ppm of cationic polymer Example 1 and Comparative Examples A-D (pH about 7.7).

Add a dose (as indicated in the brief description of FIGS. 2B and 2C) of a 0.1 wt. % aqueous solution of each cationic polymer (Example 1 and Comparative Examples A-D) to a separate bottle and include one "BLANK" bottle without any cationic polymer additive for comparison. The dosage level, in ppm (by weight), is based on the amount of cationic polymer added to the total weight of the reverse emulsion in each bottle. Shake all bottles by hand 50 times and allow to resolve for one minute to allow floe formation before capturing an image. Obtain images in the presence of a 50 ppm dosage of cationic polymer (FIG. 2B) and a 100 ppm dosage of cationic polymer (FIG. 2C).

It was observed that the resultant oil flocs separate and float on the surface of the water. It is evident from the results that the cationic polymer from Example 1 facilitates the separation of residual oil and solid particles from the synthetic produced oil-in-water emulsion at a pH of about 7.7 at concentrations of both 50 ppm and 100 ppm.

Bottle Test Procedure 3—Synthetic Produced Oil-in-Water Emulsion pH about 8.9

Prepare the synthetic produced oil-in-water emulsion as in Bottle Test Procedure 1 except add 300 μL of 2 wt. % aqueous NaOH solution to 650 mL of DI water before adding the crude oil. The resultant synthetic produced oil-in-water emulsion has a pH of about 8.9.

Figure 3A:
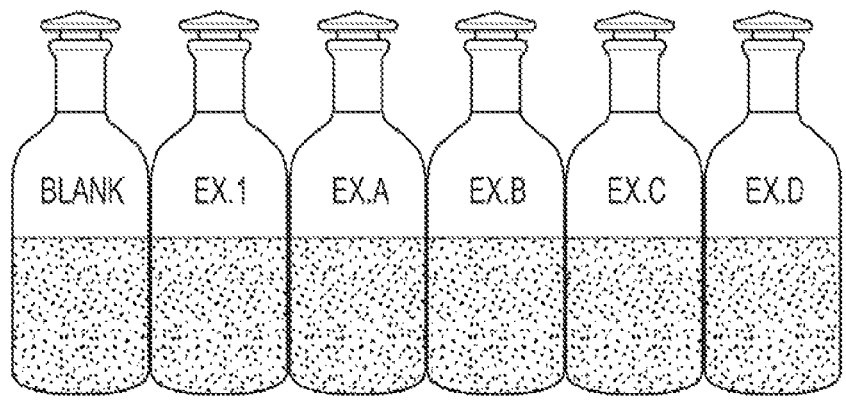
FIG. 3A is a photographic image of the synthetic produced oil-in-water emulsion for Bottle Test Procedure 3, treated with 0 ppm of cationic polymer Example 1 and Comparative Examples A-D (pH about 8.9).

Distribute the synthetic produced oil-in-water emulsion into 6 reagent bottles (100 mL each). An image of the untreated bottles is captured immediately (FIG. 3A).

Figure 3B:
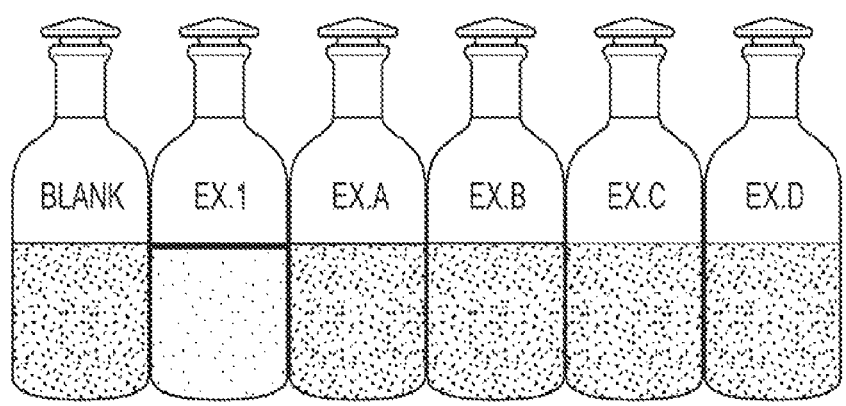
FIG. 3B is a photographic image of the synthetic produced oil-in-water emulsion for Bottle Test Procedure 3, treated with 50 ppm of cationic polymer Example 1 and Comparative Examples A-D (pH about 8.9).
Figure 3C:
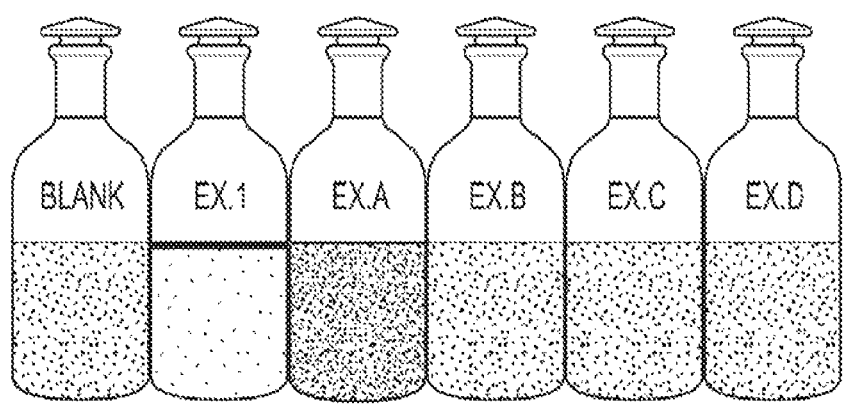
FIG. 3C is a photographic image of the synthetic produced oil-in-water emulsion for Bottle Test Procedure 3, treated with 100 ppm of cationic polymer Example 1 and Comparative Examples A-D (pH about 8.9).

Add a dose (as indicated in the brief description of FIGS. 3B and 3C) of a 0.1 wt. % aqueous solution of each cationic polymer (Example 1 and Comparative Examples A-D) to a separate bottle and include one "BLANK" bottle without any cationic polymer additive for comparison. The dosage level, in ppm (by weight), is based on the amount of cationic polymer added to the total weight of the reverse emulsion in each bottle. Shake all bottles by hand 50 times and allow to resolve for one minute to allow floc formation before capturing an image. Obtain images in the presence of a 50 ppm dosage of cationic polymer (FIG. 3B) and a 100 ppm dosage of cationic polymer (FIG. 3C).

It was observed that the resultant oil flocs separate and float on the surface of the water. It is evident from the results that the cationic polymer from Example 1 facilitates the separation of residual oil and solid particles from the synthetic produced oil-in-water emulsion at a pH of about 8.9 at concentrations of both 50 ppm and 100 ppm.

We claim:

1. A method of separating an oil-in-water emulsion formed during crude oil production into a water phase and an oil phase, comprising:
 adding 1 part-per-million (ppm) to 10,000 ppm of a cationic copolymer formed with monomers consisting of N-vinyl-2-pyrrolidone and a quaternary ammonium salt of dimethylaminoethyl methacrylate having an ester linkage and a methacrylate functionality to the oil-in-water emulsion, based on a total volume of the oil-in-water emulsion, to form the water phase and the oil phase; and
 separating the water phase from the oil phase.

2. The method of claim 1, where the quaternary ammonium salt of dimethylaminoethyl methacrylate having an ester linkage and a methacrylate functionality is 2-ethyldimethylaminoethyl methacrylate ethyl sulfate.

3. The method of claim 1, where the cationic copolymer is formed as a reaction product of about 67 weight percent (wt. %) of N-vinyl-2-pyrrolidone and about 33 wt. % of a quaternized dimethylaminoethyl methacrylate.

4. The method of claim 3, where the quaternary ammonium salt of dimethylaminoethyl methacrylate having an ester linkage and a methacrylate functionality is 2-ethyldimethylaminoethyl methacrylate ethyl sulfate.

5. The method of claim 1, where the cationic copolymer has a weight average molecular weight of about 1,000,000 g/mol.

* * * * *